Nov. 28, 1967

E. J. SCHUBERT 3,355,710

MATRIX DRIVER CONTROL CIRCUITS

Filed Jan. 7, 1964

INVENTOR.
ERNST J. SCHUBERT
BY
Vincent L. Carney
ATTORNEY

United States Patent Office 3,355,710
Patented Nov. 28, 1967

3,355,710

MATRIX DRIVER CONTROL CIRCUITS

Ernst J. Schubert, Hacienda Heights, Calif., assignor to Burroughs Corporation, Detroit, Mich., a corporation of Michigan Filed Jan. 7, 1964, Ser. No. 336,242
7 Claims. (Cl. 340—166)

ABSTRACT OF THE DISCLOSURE

Apparatus incorporating a matrix of electrical coincident-current elements and controllably-disabled sequential control circuits including a shifting device such as a ring counter having a controllable disable switch which may be adjustably connected to the output terminal of any predetermined coincident-current element for preventing the switching of succeeding ones of the elements by the control circuits, as described below in greater detail.

This invention relates to control circuits, and more particularly, relates to circuits in which voltage pulses are generated on a plurality of output terminals in sequence under the control of a series of input voltage pulses.

It is frequently desirable to produce electrical voltages in succession on a plurality of different lines. These voltages may be used to activate a printer or to control some similar sequence of operations. In such applications the lines are activated in sequence several times; each complete sequence being called a cycle. A different number of lines may be required for each format. Because of this, it is necessary to have a simple system for varying the number of lines in each sequence, or in other words, to have a variable cycle scanner. Accordingly, it is an object of this invention to provide an improved control circuit.

It is a further object of this invention to provide a variable cycle scanner.

It is a further object of this invention to provide a matrix counter for format control.

In accordance with the above objects a coincident-current core matrix activates a plurality of output terminals in a predetermined sequence. The coincident-current matrix has a different number of rows than columns. Each line in the rows is activated in sequence and in synchronism with the activation of a line in the columns so as to generate a sequence of pulses from the output terminals on the cores that are located at the intersections of the rows and columns.

The ring counter which activates each of the lines in a row and the ring counter which activates each of the lines in a column receive shifts pulses and control pulses from a common source. The two control pulses are a start pulse and a reset pulse. The start pulse is supplied whenever it is desired to generate a complete cycle of output pulses. The reset pulse determines the length (number of lines) in a cycle. This pulse is fed back from the last matrix junction that it is desired to use. This reset pulse electrically disconnects the stages of both ring counters from their ground so as to prevent further counting. The shift pulses may continue to the ring counter without starting a new cycle until a start pulse is provided.

The invention and the above-noted and other features thereof will be understood more clearly and fully from the following detailed description with reference to the accompanying drawings in which.

Figure 1:
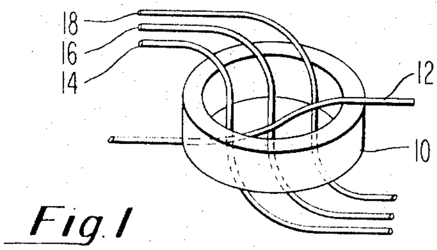
FIGURE 1 is a perspective drawing of a magnetic element used in an embodiment of the invention.

In FIGURE 1 a perspective view of a ferromagnetic core 10 in the shape of a toroid is shown having four conductors 12, 14, 16 and 18, passing through its center. This is a basic component used in a preferred embodiment of the invention. The four conductors 12, 14, 16 and 18 each form a one-turn winding on the core 10 with the conductor 12 being wound in the opposite direction as the conductors 14, 16, and 18. If a greater magnetomotive force is desired, a large number of turns can be used.

Figure 2:
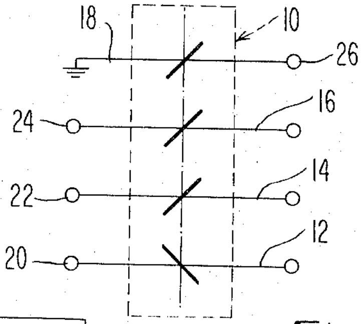
FIGURE 2 is a schematic representation of the element shown in FIGURE 1.

FIGURE 2 is a schematic representation of the core and windings shown in the perspective view of FIGURE 1. The toroidal core 10 is shown as a center line crossed by slanted lines, which slanted lines are equal in number to the windings around the core. The conductors 12, 14, 16 and 18 are each shown as passing through one of the slanted lines; the direction in which the line is slanted indicates the direction of the windings.

The core 10 has a rectilinear hysteresis loop. A DC current applied to terminal 20 of conductor 12 biases the core 10 so that it has a flux density in one direction, which will be called the "zero" direction, which flux density is less than the saturation flux density. A DC current applied to either terminal 22 on conductor 14 or to terminal 24 on conductor 16 will bias the core in the opposite direction, which will be called the "one" direction. However, the currents applied to these terminals in this embodiment are not sufficient for the coil to be saturated when a current is applied to only one of the terminals 22 and 24. When a DC current is applied to both terminals 22 and 24 simultaneously, the core 10 is driven into saturation so as to induce a voltage in the conductor 18 which will appear as an output voltage at terminal 26.

Figure 3:
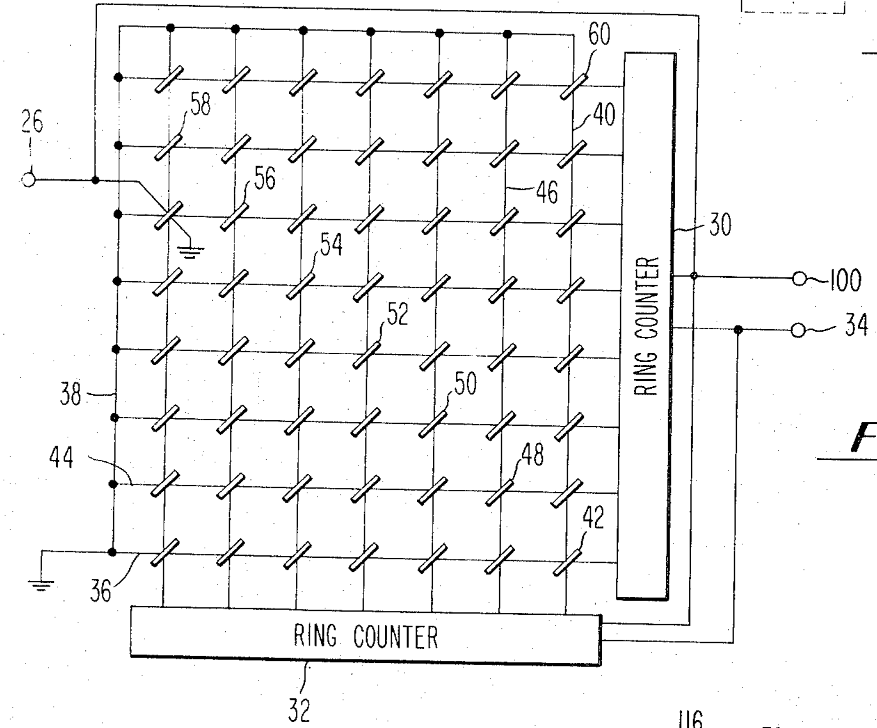
FIGURE 3 is a schematic circuit diagram of an embodiment of the invention.

In FIGURE 3, a matrix, having fifty-six cores of the type shown in FIGURES 1 and 2, is shown. A ring counter 30 has each of its eight output terminals electrically connected to the windings 22 of a row of seven of the fifty-six cores; the ring counter 32 has each of its seven output terminals electrically connected to the windings 24 of the column of eight of the core devices. In this way each core is electrically connected to one of the outputs from the ring counter 32 and one of the outputs from the ring counter 30. A terminal 34 is electrically connected to the inputs of both the ring counter 30 and 32. The ring counter 32 operates in modulo seven and the ring counter 30 operates in modulo eight.

Assuming that both the ring counter 30 and the ring counter 32 have been reset, the first pulse on terminal 34 causes the ring counter 30 to provide an output current pulse on line 36 passing through seven cores in its path to the common ground 38 and causes the ring counter 32 to provide a current pulse on line 40 passing through eight cores in its path to the common grounded conductor 38. The core 42 is the only core of the fifty-six cores in the matrix which will receive two current pulses; one from ring counter 30 and one from ring counter 32. As explained in connection with FIGURE 2, the coincidence from the two current pulses causes the core 42 to provide an output voltage pulse on the terminal 26 shown in FIGURE 2.

The next voltage pulse applied to terminal 34 causes the shift register 30 to provide an output current on line 44 and causes the ring counter 32 to provide an output current pulse on line 46. These two currents pass through the core 48 causing it to provide an output pulse.

The next five clock pulses applied to terminal 34 result in output pulses from the five cores 50, 52, 54, 56, and 58, which are electrically connected in that order to the next five successive outputs of both ring counters. However, the next voltage pulse applied to terminal 34 results in an output on the eighth and last terminal on the ring counter 30 and an output on the first output terminal of the ring counter 32. These current pulses cause the core 60 to generate a voltage pulse. The next clock pulse applied to terminal 34 selects a core that is connected to the first output of the shift register 30 and the second output of the shift register 32 to provide an output voltage pulse. This process continues until all of the possible combinations of the output lines from the ring counter 32 with the output lines from the ring counter 30 have been covered, so as to result in one output pulse having been generated by each of the fifty-six cores in the matrix of FIGURE 3. These pulses may be used as a pulse scanner for many purposes such as the operation of the anvils of a printer.

Figure 4:
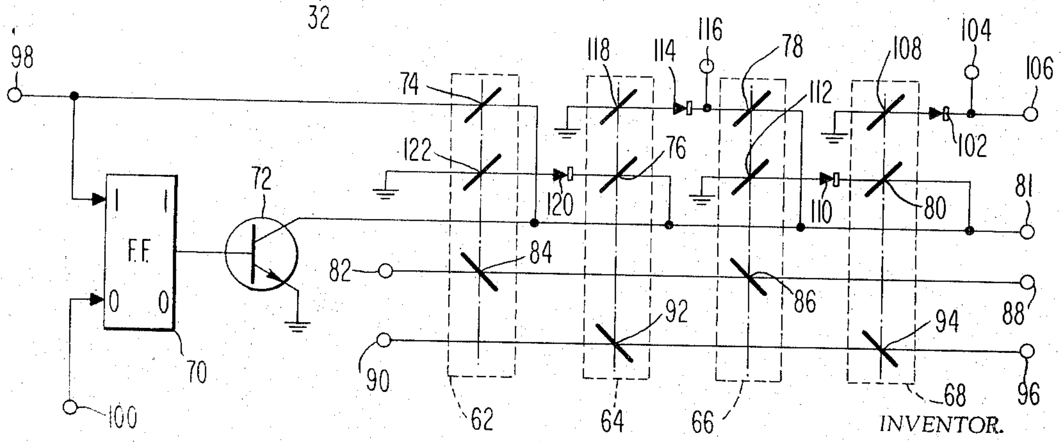
FIGURE 4 is a schematic circuit diagram of a portion of a ring counter which may be used in an embodiment of the invention.

In FIGURE 4 two stages of a ring counter that may be used for the ring counter 30 or the ring counter 32 are shown having a core 62 and a core 64 in the first stage and a core 66 and a core 68 in the second stage. A control flip-flop 70 has one of its two outputs electrically connected to the base of the NPN transistor 72. The emitter of the transistor 72 is grounded. The collector of the control transistor 72 is electrically connected to one end of a winding 74 on the core 62, to one end of a winding 76 on the core 64, to one end of a winding 78 on the core 66, to one end of a winding 80 on the core 68 and to terminal 81. A terminal 82, a winding 84 on the core 62, a winding 86 on the core 66, and a terminal 88 are electrically connected in series in the order named; a terminal 90, a winding 92 on the core 64, a winding 94 on the core 68, and a terminal 96 are electrically connected in series in the order named. A terminal 98 is electrically connected to the other end of the winding 74 and to the "one" input terminal of the flip-flop 70; a terminal 100 is electrically connected to the "zero" terminal of the flip-flop 70.

The cathode of a diode 102 is electrically connected to a terminal 104 and to a terminal 106; the anode of the diode 102 is electrically connected to ground through the winding 108 on the core 68. The cathode of a diode 110 is electrically connected to the other end of the winding 80; a winding 112 on the core 66 is electrically connected at one end to ground and at the other end to the anode of the diode 110. The cathode of a diode 114 is electrically connected to the other end of the winding 78 and to the terminal 116; a winding 118 on the core 64 is electrically connected to ground at one end and to the anode of the diode 114 at the other end. The cathode of a diode 120 is electrically connected to the other end of the winding 76; a winding 122 on the core 62 is electrically connected at one end to ground and at the other end to the anode of the diode 120.

Additional stages of the ring counters are or may be electrically connected to terminals 106, 81, 88 and 96 in the same manner as the previous stages so as to form a seven stage counter to be used as counter 32 shown in FIGURE 3 and to form an eight stage counter to be used as ring counter 30 shown in FIGURE 3. Of course, the final output terminal is also connected to the start terminal 98 so as to provide for continuous recycling of the counter. The terminal 98, the flip-flop 70, the terminal 100 and the transistor 72 may be common to both ring counter 32 and ring counter 30 or individual components may be used for each counter.

A start pulse on terminal 98 performs two functions. It switches the flip-flop 70 so as to provide a positive output at the "one" terminal, which is electrically connected to the base of transistor 72 and it switches the core 62 to the "zero" state by driving a current through the windings 74. The voltage pulse at the base of transistor 72 biases this transistor into conduction so as to provide a ground connection for the windings that are electrically connected to the collector of the transistor. Shift pulses applied to terminals 82 and 90 step the count of the ring counter from one output to the other. The pulses applied to terminal 82 are out of phase with the pulses applied to terminal 90.

The winding 84 is wound in the opposite direction as the winding 74 so that a pulse applied to terminal 82 after a pulse has been applied to start terminal 98 reshifts the core back to its original state. This causes an output pulse to be generated in winding 122. This pulse is conducted through the diode 120 and through the winding 76 of the core 64 and switches this core to its "zero" condition. The next shift pulse is applied to terminal 90 and passes through the winding 92 which is in the opposite direction as the winding 76. This shifts the core 64 back to the "one" state causing an output pulse to be generated at the winding 118. This pulse is passed through the diode 114 to the ring counter output terminal 116 and through winding 78 of the core 66.

The following shift pulse is applied to terminal 82 and passes through the winding 86 so as to shift core 66. The shifting of the core from one state to the other causes a pulse to be generated in winding 112 which in tern passes through winding 80 so as to shift the core 68. The next pulse applied to terminal 90 shifts the core 68 back to its original state which causes a pulse to be generated in winding 108, which pulse is passed to the output terminal 104 of the ring counter and also the next core which may be electrically connected to the terminal 106. In this way pulses are stepped along the output terminals of the ring counter.

It is frequently desirable to vary the number of counts provided in a cycle by the counter shown in FIGURE 3. To do this, the output from the last desired winding in the matrix of FIGURE 3 is electrically connected to the reset terminal 100 as shown, for example, at the core to the left of core 56. When this last output is reached, the voltage is applied through terminal 100 to the flip-flop 70 switching it to its "zero" state. This causes the transistor 72 to become non-conducting. When the transistor 72 is non-conducting, the ground connection to the windings 74, 76, 78 and 80 is disconnected from ground so as to prevent further shifting from core to core along the ring counter. The shift pulses may continue to be applied to terminals 82 and 90, but since the cores are all driven to their "zero" state, only the one core beyond the last output will be switched.

It can be seen that the number of counts per cycle for the matrix counter described above may be easily controlled, through the use of a simple plug connection between the matrix shown in FIGURE 3 and the terminal 100. Of course, this technique may be used with other kinds of shift registers utilizing transistors or vacuum tubes by disconnecting one of the essential electrodes through a flip-flop arrangement as illustrated in FIGURE 4. This system is especially well suited for format control to select the number of characters per line.

Obviously, many modifications and variations of the present invention are possible in the light of the above teachings. It is therefore to be understood that within the scope of the appended claims the invention may be practiced otherwise than as specifically described.

What is claimed is:

1. The combination comprising:

a ring counter including a plurality of ring counter stages;

a shift pulse terminal, electrically connected to said ring counter, adapted to receive shift pulses so as to cause said ring counter to cyclically provide output pulses at each of its stages in response to said shift pulses;

a start terminal, electrically connected to said ring counter, adapted to receive a start pulse so as to initiate counting by said ring counter at a predetermined stage of said ring counter; and disabling means, electrically connected to each of said ring counter stages, for disabling said stages from providing output pulses between the time that an output pulse from a predetermined one of said stages of said ring counter coincides with a second predetermined event and the time that a start pulse is applied to said start pulse terminal, and for enabling said stages when said start pulse is applied to said start pulse terminal.

2. The combination according to claim 1 in which said disabling means comprises:

adjustable means for generating an output pulse upon the coincidence of a predetermined event with an output pulse from a predetermined one of said stages of said ring counter; and switch means, electrically connected to said start terminal, to said adjustable means and to said ring counter, for disconnecting an element of each of said stages of said ring counter upon receiving a pulse from said adjustable means and for reconnecting said element of each of said stages of said ring counter upon receiving a pulse from said start terminal.

3. The combination according to claim 2 in which said switch means comprises:

a non-complementing flip-flop having one input electrically connected to said start terminal and the other input electrically connected to said adjustable means; and a current valve having one electrode grounded, another electrode connected to each of said stages of said ring counter and a third electrode electrically connected to one of the outputs of said flip-flop.

4. An adjustable pulse generator comprising:

a first ring counter having a predetermined number of stages;

a second ring counter having a greater number of stages than said first ring counter;

a plurality of coincidence circuits;

each of said coincidence circuits being electrically connected to a different output of said first ring counter and a different output of said second ring counter;

each of said coincidence circuits comprising means for providing an output voltage pulse upon receiving a pulse from said first ring counter coincidently with a pulse from said second ring counter;

a shift-pulse terminal adapted to receive shift pulses and being electrically connecting to both said first ring counter and said second ring counter whereby said first ring counter and said second ring counter count in synchronism; and control means, electrically connected to said coincidence circuits and to said first and second ring counters, for preventing said counters from counting after a predetermined number of counts.

5. A variable cycle pulse generator according to claim 4 in which said control means comprises:

a start terminal adapted to receive pulses for starting a new counting cycle;

connector means adapted to be connected to the output terminal of any one of said coincidence circuits so as to receive an output pulse from said coincidence circuit; and switch means, electrically connected to said start terminal, said connector means and said first and second ring counters for disabling said first and second ring counters upon receiving a voltage pulse on said connector means and for enabling said first and second ring counters upon receiving a voltage pulse on said start terminal.

6. A variable cycle pulse generator according to claim 5 in which said switch means comprises:

an NPN transistor having its emitter grounded, its collector electrically connected to said first and second ring counters, and having a base; and a non-complementing flip-flop having one input electrically connected to said start terminal, having its other input electrically connected to said connector means, and having one output electrically connected to the base of said NPN transistor.

7. A variable cycle counter comprising:

a matrix of ferromagnetic cores having one more column of cores than rows of cores;

each of said ferromagnetic cores having an output winding, a column winding, and a row winding each wound in the same direction;

a column ring counter;

each of said column windings in any one column of said ferromagnetic cores being electrically connected in series with each other and to a corresponding one of the output terminals of said column ring counter;

a row ring counter;

each of the row windings in any row of said ferromagnetic cores being electrically connected in series with each other and to a corresponding output terminal of said row ring counter;

said row ring counter and said column ring counter comprising a plurality of ferromagnetic cores each having at least one winding;

said output terminals of said ring counters being electrically coupled to different ones of the counter windings;

an NPN transistor having its emitter grounded;

each of the ring counter windings being electrically connected at one end to the collector of said NPN transistor;

a start terminal adapted to receive start pulses whereby a new counting cycle may be initiated;

connector means adapted to be connected to any one of said output windings of said ferromagnetic cores; and a non-complementing flip-flop having one input electrically connected to said start terminal, having its other input electrically connected to said connector means, and having one output electrically connected to the base of said NPN transistor.

References Cited

UNITED STATES PATENTS

| | | | |
|---|---|---|---|
| 3,026,420 | 3/1962 | Whitely | 340—174 |
| 3,047,842 | 7/1962 | Johnston | 340—174 |
| 3,175,208 | 3/1965 | Simmons | 340—166 |
| 3,246,306 | 4/1966 | Young | 340—174 |
| 3,268,736 | 8/1966 | Marcus | 340—174 |

NEIL C. READ, *Primary Examiner.*

H. I. PITTS, *Assistant Examiner.*